(No Model.)

G. H. MOORE.
WASHER FOR LOCKING NUTS ON BOLTS.

No. 249,383. Patented Nov. 8, 1881.

Witnesses.
Francis L. Clark
Claudius Parker

Inventor George H. Moore
By Attorney George H. Christy

United States Patent Office.

GEORGE H. MOORE, OF VERONA, PENNSYLVANIA, ASSIGNOR TO HIMSELF AND CHARLES D. WILEY, OF SAME PLACE.

WASHER FOR LOCKING NUTS ON BOLTS.

SPECIFICATION forming part of Letters Patent No. 249,383, dated November 8, 1881.

Application filed August 11, 1881. (No model.)

*To all whom it may concern:*

Be it known that I, GEORGE H. MOORE, of Verona, county of Allegheny, State of Pennsylvania, have invented or discovered a new and useful Improvement in Washers for Locking Nuts on Bolts; and I do hereby declare the following to be a full, clear, concise, and exact description thereof, reference being had to the accompanying drawings, making a part of this specification, in which—like letters indicating like parts—

Figure 1:
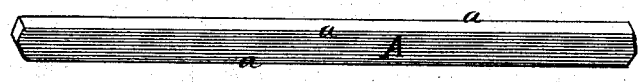
Figure 2:
Figure 3:
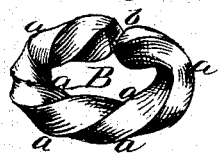
Figure 4:
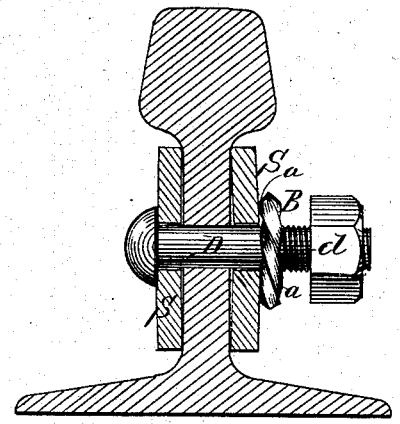

Figure 1 is a perspective view of a portion of a rectangular steel bar, and Fig. 2 is a similar view of such bar twisted for the purpose of being made into my improved washers. Fig. 3 is a perspective view of the washer as made from the twisted bar; and Fig. 4 is a sectional view of a railroad-rail and splice-bars, with the bolt and washer in elevation, the same being illustrative of one application of my improved washer.

My invention relates to a washer for locking the nut on a bolt; and it consists of a hardened steel ring made from a bar angular in cross-section and twisted, thereby giving the angles or edges of the ring a spiral curve or course around its surface.

In the drawings, A, Fig. 1, represents an ordinary rectangular merchant bar of steel, which, by any of the methods commonly practiced in the art, is twisted axially, so as to give its angles or edges a spiral bend or curve around the surface of the bar, as in Fig. 2. Such twisted bar is cut into suitable lengths, and the separate blanks are bent in the form of a ring, B, Fig. 3, such ring having its angles or edges *a* bent spirally around its surface, as in the bar, Fig. 2, from which it was made. This cutting into lengths and bending may be done either by hand or by machinery, preferably the latter, and the ends *b* of such ring may be welded or left open, as desired. After bending, the washers are hardened by tempering to any desired degree.

In use, the ring or washer thus made is placed on the threaded end of the bolt D under the nut *d*. I have illustrated the application of my invention in Fig. 4 to a rail-joint; but it may be applied in various other ways as well. In the case shown the washer bears against the splice-bar S, and upon screwing down the nut *d* the spiral edges *a* of the washer are pressed somewhat into the soft-metal plate S, so as to take a bite thereon and prevent turning of the washer. By turning the nut *d* on the washer in screwing it home the spiral edges *a* tend to turn up small fins or ridges of metal on the face of the nut, which work outward and pass over the edges *a* as the latter turn under the washer, and the slight fins or ridges thus raised, pressing against the edges, prevent tendency of the nut to unscrew, except upon the application of unusual force by design.

If the device be used in a place subject to considerable jarring, as on rail-joints, &c., the edges *a* will also cut slightly into the face of the nut, and by such action, together with the tendency to turn up fins, as above described, the edges *a* effectually lock the nut and prevent it from becoming loosened.

It will be observed that this washer does not operate as a spring, and it has no spring action either with relation to the splice-bar or nut. It may therefore be made of much cheaper grades of steel than is required for spring-washers. The desired results are secured by the hardened spiral edges *a*, which are practically rigid or inflexible, and indent or cut into the nut, as described, thereby preventing accidental unscrewing.

I have shown the washer made from a rectangular bar, and while I prefer this form, principally on the ground of economy, still other forms may be used for the purpose, as triangular, hexagonal, &c., which, by twisting, as described, will give spirally-wound edges *a* around the surface of the washer.

In case a machine is used for twisting and bending, these operations may be performed by one passage through the machine.

I claim herein as my invention—

A metallic washer for locking nuts on bolts, consisting of a ring of hardened steel, angular in cross-section, and having its angles or edges formed in a spiral direction around its surface, substantially as shown and described.

In testimony whereof I have hereunto set my hand.

GEORGE H. MOORE.

Witnesses:
S. HARVEY THOMPSON,
CLAUDIUS L. PARKER.